(12) United States Patent
Choudhary et al.

(10) Patent No.: US 7,783,638 B2
(45) Date of Patent: Aug. 24, 2010

(54) SEARCH AND QUERY OPERATIONS IN A DYNAMIC COMPOSITION OF HELP INFORMATION FOR AN AGGREGATION OF APPLICATIONS

(75) Inventors: Samar Choudhary, Morrisville, NC (US); John R. Hind, Raleigh, NC (US); Shikha Srivastava, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1375 days.

(21) Appl. No.: 10/875,971

(22) Filed: Jun. 24, 2004

(65) Prior Publication Data

US 2005/0154719 A1    Jul. 14, 2005

Related U.S. Application Data

(63) Continuation-in-part of application No. 10/754,375, filed on Jan. 9, 2004.

(51) Int. Cl.
    *G06F 7/00* (2006.01)
    *G06F 9/00* (2006.01)
(52) U.S. Cl. ................................. 707/736; 715/705
(58) Field of Classification Search .............. 715/705, 715/714; 707/3–5, 104, 736, 769
    See application file for complete search history.

(56) References Cited

U.S. PATENT DOCUMENTS 5,361,361 A * 11/1994 Hickman et al. ............ 715/705
6,240,410 B1 * 5/2001 Wical ............................ 707/4
6,563,514 B1    5/2003 Samar
6,573,906 B1    6/2003 Harding
6,820,094 B1 * 11/2004 Ferguson et al. ............ 707/200
7,062,511 B1 * 6/2006 Poulsen ................... 707/104.1
7,287,214 B1 * 10/2007 Jenkins et al. .............. 715/500
2002/0053020 A1    5/2002 Teijido et al.
2003/0001875 A1    1/2003 Black et al.
2003/0137538 A1    7/2003 Hesmer et al.
2004/0015566 A1 * 1/2004 Anderson et al. ............ 709/219
2004/0059705 A1 * 3/2004 Wittke et al. ................. 707/1
2005/0065913 A1 * 3/2005 Lillie et al. ................... 707/3
2005/0154986 A1 * 7/2005 Bartek et al. ................ 715/714
2005/0198042 A1 * 9/2005 Davis ......................... 707/10

* cited by examiner

*Primary Examiner*—Hung T Vy
(74) *Attorney, Agent, or Firm*—Andre M. Gibbs, Esq.; Steven M. Greenberg, Esq.; Carey Rodriguez Greenberg & Paul LLP

(57) ABSTRACT

The present invention is a method, system and apparatus for supporting search and query operations in a composite help view for an aggregation of applications. The system can include an application aggregator configured to aggregate individual applications into a single aggregated view. The system further can include a help system configured to render a help system view having composite help documentation formed from at least two help documents, each of the help documents corresponding to one of the individual applications. Help invoking logic can be coupled to the help system and disposed in the single aggregated view. A search and query tool also can be coupled to the help system through a search and query interface. Finally, an index can be coupled to the search and query tool. The index can include keywords disposed in the help documents and title information for individual applications corresponding to the help documents.

18 Claims, 6 Drawing Sheets

SEARCH AND QUERY OPERATIONS IN A DYNAMIC COMPOSITION OF HELP INFORMATION FOR AN AGGREGATION OF APPLICATIONS

CROSS-REFERENCE TO RELATED APPLICATIONS

This patent application claims the benefit under 35 U.S.C. §120 as a continuation-in-part of presently pending U.S. patent application Ser. No. 10/754,375, entitled DYNAMIC COMPOSITION OF HELP INFORMATION FOR AN AGGREGATION OF APPLICATIONS, filed on Jan. 9, 2004, the entire teachings of which are incorporated herein by reference.

BACKGROUND OF THE INVENTION

1. Statement of the Technical Field

The present invention relates to application help systems and more particularly to providing composed help for an aggregation of applications.

2. Description of the Related Art

Distributing content about large computer communications networks is not without its challenges. In particular, the quantity of content available for distribution in a computer communications network often varies proportionally to the size of the computer communications network. At the extreme, the Internet hosts a vast quantity of content not easily accessible by most end-users. Content aggregation systems such as portals represent a sensible solution to the problem of aggregating content through a channel paradigm in a single, network-addressable location. In consequence, aggregation technologies like portals have become the rage in content distribution.

Portlets are the visible active components included as part of portal pages. Similar to the graphical windows paradigm of windowing operating systems, each portlet in a portal occupies a portion of the portal page through which the portlet can display associated content from a portlet channel. Portlets are known to include both simple applications such as an electronic mail client, and also more complex applications such as forecasting output from a customer relationship management system. The prototypical portlet can be implemented as server-side scripts executed through a portal server.

From the end-user perspective, a portlet is a content channel or application to which the end-user can subscribe. By comparison, from the perspective of the content provider, a portlet is a means through which content can be distributed in a personalized manner to a subscribing end-user. Finally, from the point of view of the portal, a portlet merely is a component which can be rendered within the portal page. In any case, by providing one or more individually selectable and configurable portlets in a portal, portal providers can distribute content and applications through a unified interface in a personalized manner according to the preferences of the end-user.

Portal servers are computer programs which facilitate the distribution of portal based Web sites on the public Internet or a private intranet. Importantly, it will be recognized by one of ordinary skill in the art that the signature characteristic of all conventional portal servers can include the aggregation of content from several portlet applications within a single distributable page in a uniform manner. To that end, each portlet application within the portal page can be represented by a portlet user interface distributed by the portal server to requesting client computing devices.

New content distribution technologies like portal technologies bring a new dimension to creating dynamically composed applications. For instance a portal server can aggregate a Web page using content from multiple, independently developed portlets. The portlets may be written by the same portlet writer, or a different portlet writer. Considering the dynamic nature of such aggregated pages, the conventional help mechanisms configured for use with singular applications cannot suffice for composite applications such as those produced in the portal environment.

For instance, it is well known that in singular application environment, a structured help document can be coupled to the singular application and triggered by the selection of a help option disposed within the user interface of the application. As a one to one correspondence exists between the help system and the application, the entirety of the help documentation can be accessed through the help system. In the portal environment, however, each portlet can be considered a separate application which has been aggregated with other applications to form a composite application. As such, each portlet will have its own help system and a unified system of help will not exist.

While it has been suggested that a single comprehensive help document can suffice for aggregate applications such as portals, this view remains flawed because the composition forming the aggregate application can change based upon the personalization feature of portal technology. Accordingly, to present a comprehensive help document addressing all possible permutations of the applications in the aggregation can produce an unwieldy and unhelpful help document. Thus, there is a need for a help system that can dynamically aggregate help or information to match the aggregation of the pages in the composite application.

Producing a help system that can dynamically aggregate help or information to match the aggregation of the pages in the composite application is not without its own challenges. In conventional help systems, a search engine can located particular topics within the single help document through a keyword searching of the help document. To facilitate and accelerate the searching process, the single help document can be indexed by keyword. In this way, the index can be searched much more quickly and the pertinent location of the desired information can be located by reference to the index. In a system of dynamically aggregated help information, however, the help documents forming the dynamic aggregation can change as often as the components of the composite application. Thus, re-indexing will be required frequently if not always—whenever the composition changes.

SUMMARY OF THE INVENTION

The present invention addresses the deficiencies of the art in respect to help systems and provides a novel and non-obvious method, system and apparatus for configuring a composite help view in an aggregation of applications for search and query operations. In a preferred method of the invention, at least two separate help documents can be obtained, each of the separate help documents having an association with a corresponding one of separate applications aggregated together into a single aggregated view. The separate help documents can be aggregated into a composition of help documents corresponding to the single aggregated view and the composition of help documents can be rendered in a help system view responsive to a request for help initiated in the single aggregated view.

Search keywords and titles to corresponding ones of the applications in the single aggregated view can be extracted from the help documents. Specifically, the extracting step further can include the step of extracting author contact information for a corresponding one of the applications in the single aggregated view, support information for a corresponding one of the applications in the single aggregated view, links internal to the help documents, and/or links external to the help documents. Subsequently, the extracted keywords and the titles can be stored in a searchable index. Finally, a search and query interface to the searchable index can be disposed in the single aggregated view. In this way, search and query operations can be performed against the index without requiring a direct searching of the help documents themselves.

The method can include in a particular aspect of the invention the step of performing at least one query of the index through the search and query interface using searching criteria to produce a personalized search result. The personalized search result can be stored in a bookshelf and the bookshelf can be rendered in the single aggregated view. Subsequently, an additional search can be applied against the personalized bookshelf to produce a focused set of search results for terms used in the at least two separate help documents. Finally, the bookshelf can be dynamically updated whenever a new application is deployed in the application.

A system for producing a composite help view for an aggregation of applications can include an application aggregator configured to aggregate individual applications into a single aggregated view. The system further can include a help system configured to render a help system view having composite help documentation formed from at least two help documents, each of the help documents corresponding to one of the individual applications. Help invoking logic can be coupled to the help system and disposed in the single aggregated view. A search and query tool also can be coupled to the help system through a search and query interface. Finally, an index can be coupled to the search and query tool. The index can include keywords disposed in the help documents and title information for individual applications corresponding to the help documents.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for dynamically composing and rendering a composite help view for an aggregation of applications. In accordance with the present invention individual help files associated with corresponding applications can be dynamically combined in a single composition as the corresponding applications are combined in the aggregation of applications. The aggregation of applications subsequently can be rendered in an aggregated view along with a logic for invoking the composition. Responsive to the operation of the logic, the composition can be rendered in a composite help view.

In a preferred aspect of the invention, each help page associated with an application configured for inclusion in a single composition can be inspected to extract identifying information relating to the help page and the associated application. The extracted information can be added to a help index. Subsequently, queries and search requests can be performed against the index to locate suitable help pages. Individual queries and searches can be stored for subsequent use as a personalized query in the form of a "bookshelf" of help information. Importantly, the applications associated with help pages can be located by way of the identifying information such that a direct linkage between the applications in the composition and the index is not necessary. Consequently, the addition of a new application in the composition will not necessitate a resource expensive re-indexing operation.

Figure 1:
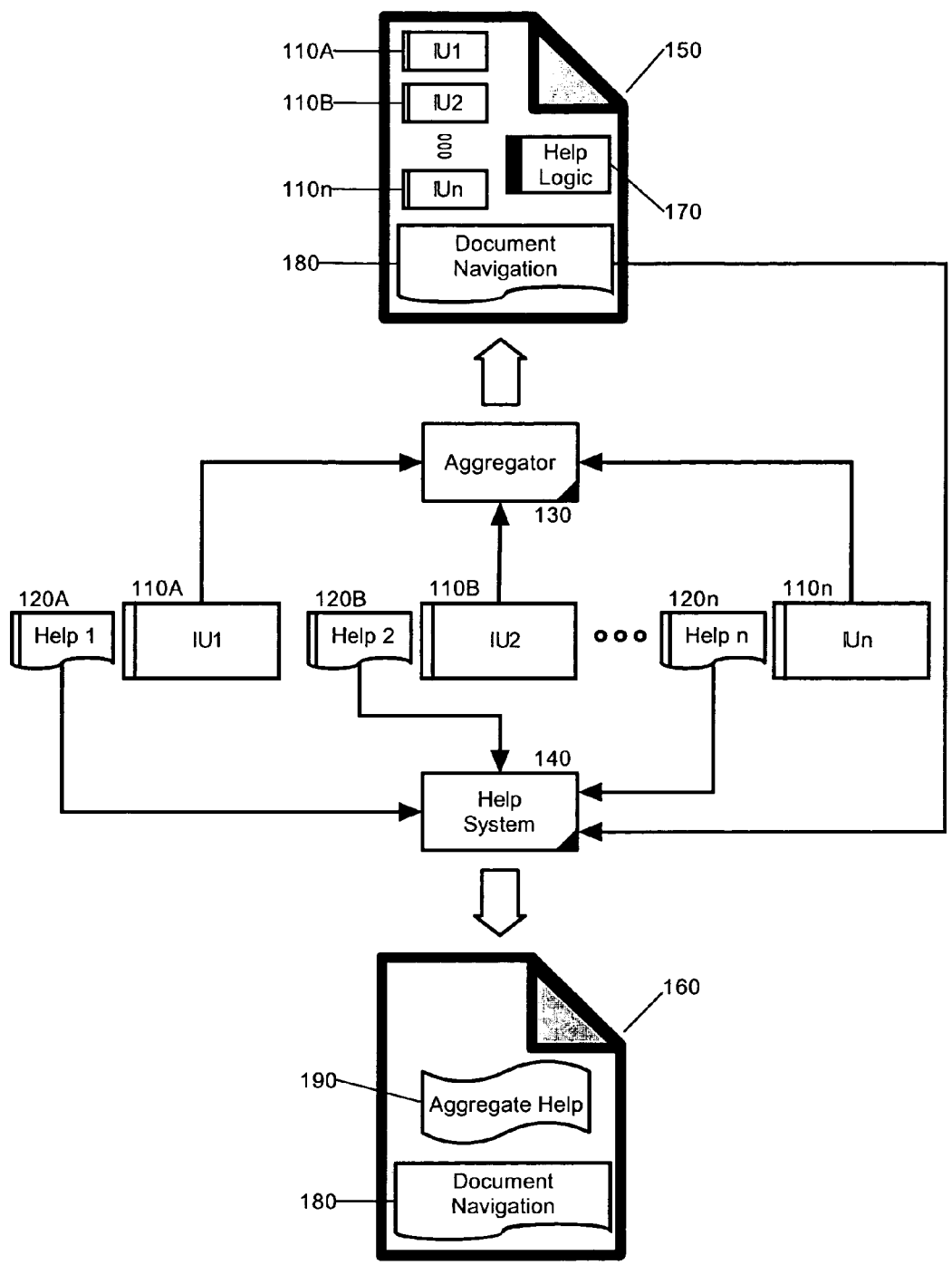
FIG. 1 is schematic illustration of a help composition system which has been configured in accordance with the present invention.

Notably, the searching and querying operations of the present invention can be configured for operation with a dynamic help composition system. To that end, FIG. 1 is schematic illustration of a help composition system which has been configured in accordance with the present invention. The system can include a multiplicity of applications 110A, 110B, 110n configured for aggregation into a single view 150. In a preferred albeit nonexclusive aspect of the present invention, the applications 110A, 110B, 110n can be portlet pages configured for aggregation into a portal view. Notably, each of the applications 110A, 110B, 110n can include an associated help document 120A, 120B, 120n. The content of each of the help document 120A, 120B, 120n can be directed to the specific context of a corresponding one of the applications 110A, 110B, 110n.

An application aggregator 130 can be coupled to each of the applications 110A, 110B, 110n. The application aggregator 130 can combine selected ones of the applications 110A, 110B, 110n to form the single aggregation 150. In particular, the application aggregator 130 can place the visual interface for each of the selected ones of the applications 110A, 110B, 110n into a computed position in the single aggregation 150 so as to provide a personalized application interface as is well known in the art. Notably, in addition to combining selected ones of the applications 110A, 110B, 110n in the aggregation 150, the aggregator 130 further can include a document navigation view 180 in the aggregation 150 so as to permit the navigation of multiple aggregations through the view of the single aggregation 150.

In accordance with the present invention, a help system 140 can be coupled to the help document 120A, 120B, 120n. The help system 140 can combine the help documents 120A, 120B, 120n to form a single composition 190. Notably, the single composition 190 can be produced only in respect to those applications 120A, 120B, 120n selected for inclusion in the aggregation 150. In this regard, the single composition 190 can be produced exclusively for the aggregation 150. Accordingly, as it will be recognized by the skilled artisan, multiple compositions can be generated for different aggregations, thereby providing a customized help view for different personalized arrangements of the applications 110A, 110B, 110n.

To couple the aggregation 150 to the help system 140, help logic 170 can be disposed within the visual view of the aggregation 150. The help logic 170 can be a selectable entity in the visual view of the aggregation 150 which has been programmed to access the composition 160, for example by providing an identity of the composition 160, or by providing an identity for the aggregation 150. In either case, the help logic 170 also can be programmed to pass the document navigation view 180, in the form of an index or table of contents for example, to the help system for parallel rendering in the composition along with the composition 190. As it is known in the art, disposing a selectable entity within a visual view of an application can be implemented through conventional server page technology in which tag logic can generate an appropriate address through which additional content can be accessed responsive to the selection of the selectable entity.

Figure 2:
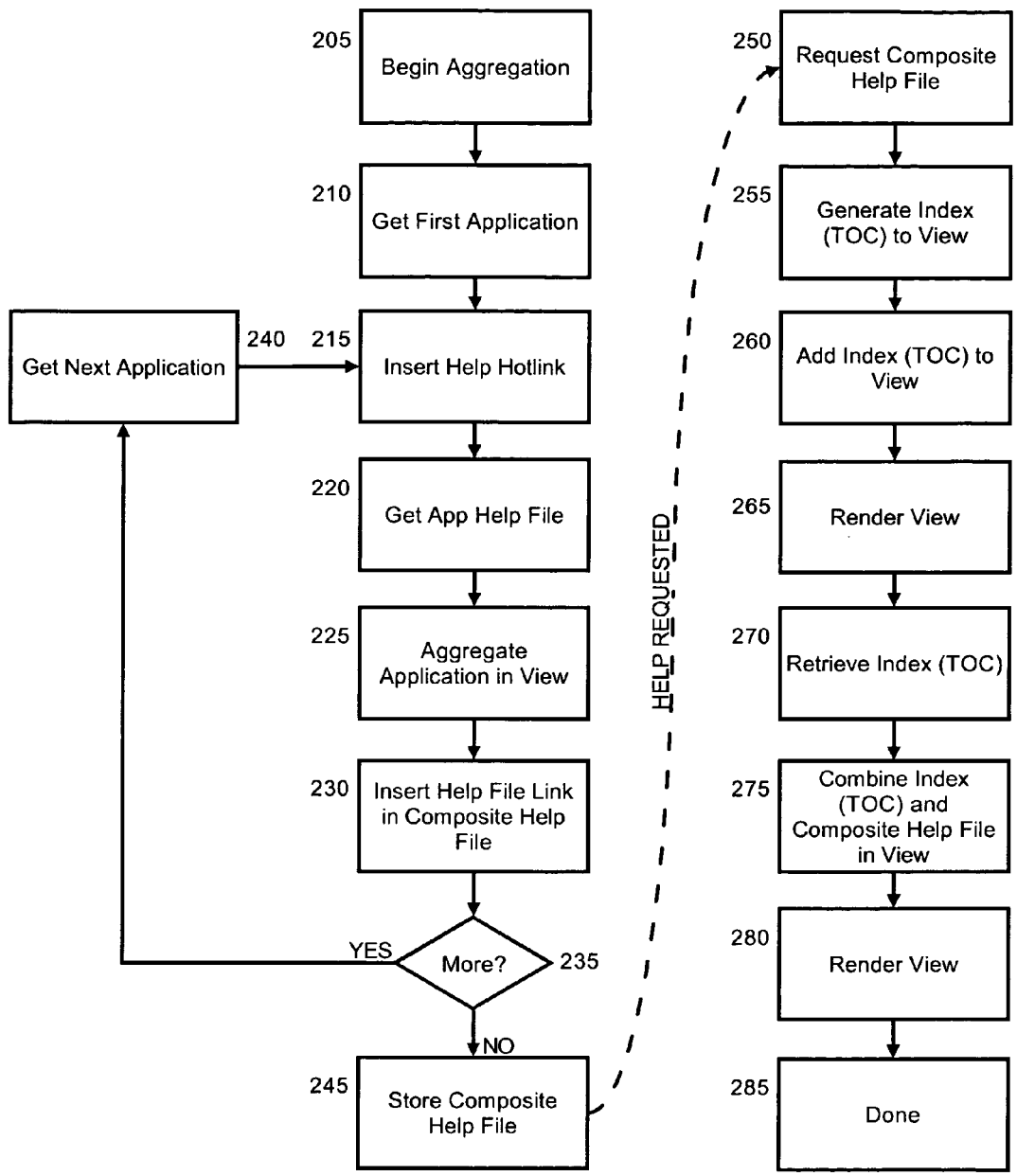
FIG. 2 is a flow chart illustrating a process for composing a help view for an aggregation of applications in the system of FIG. 1.

FIG. 2 is a flow chart illustrating a process for composing a help view for an aggregation of applications in the system of FIG. 1. The processes illustrated in FIG. 2 can be bifurcated into two sub-processes—a process for generating the help composition for the aggregation, and a process for activating and rendering the composition. Beginning first with the process for generating the composition in block 205 and continuing through block 210, a first application can be selected for aggregation. In block 215, help logic for activating the help system can be disposed within the application. Specifically, the help logic can be server page logic configurable through a tag library. Responsive to the activation of the help logic, the help logic can generate an appropriate network address for the help system along with identifying information for the aggregation.

Continuing in block 220, an associated help file can be selected for association with the aggregation. In block 225 the application can be aggregated into the view of the aggregation while in block 230 the help file can be added to the composite help file, for instance by inserting a hyperlink reference to the associated help file in the composition. In decision block 235, if additional applications remain to be processed, in block 240 the next application to be added to the aggregation can be selected and the process can continue in block 215 through block 230.

Once all applications have been combined in the aggregation, and when all associated help files have been combined into the composition, in block 245 the composition can be stored in the help system. In this regard, the composition can be stored within an archive file which can be accessed by a conventional help system such as the help system included within the Eclipse open development platform. In any case, in block 250, a navigation index to the aggregation can be generated and in block 455 the navigation index can be rendered in the aggregation view. Finally, in block 260, the view of the aggregation can be rendered for the benefit of the end user.

Once the view of the aggregation has been rendered, an end user can select the help hotlink in the view which can trigger the rendering of a help view through the help system. In response, in block 265, the composite help file stored in block 245 can be retrieved. In block 270, the index to the aggregated view generated in block 250 can be retrieved as well and converted to a format suitable for use in a help system view. In block 275 the index and the composite view can be combined in a help system view and in block 280 the help system view can be rendered. Finally, in block 285, the process can end.

Importantly, in a preferred embodiment, the dynamic aggregation of help can be produced through a centralized help display system such as the information center provided in the open source Eclipse platform. As it is known in the art, interface units developed for inclusion in a composite view can incorporate help pages which interface units and help pages can be combined in a single archive. Accordingly, the aggregator can generate the dynamic aggregation of help by combining the help pages in the single archive for the multiple interface units when the interface units are selected for incorporation in a composite view.

Figure 3:
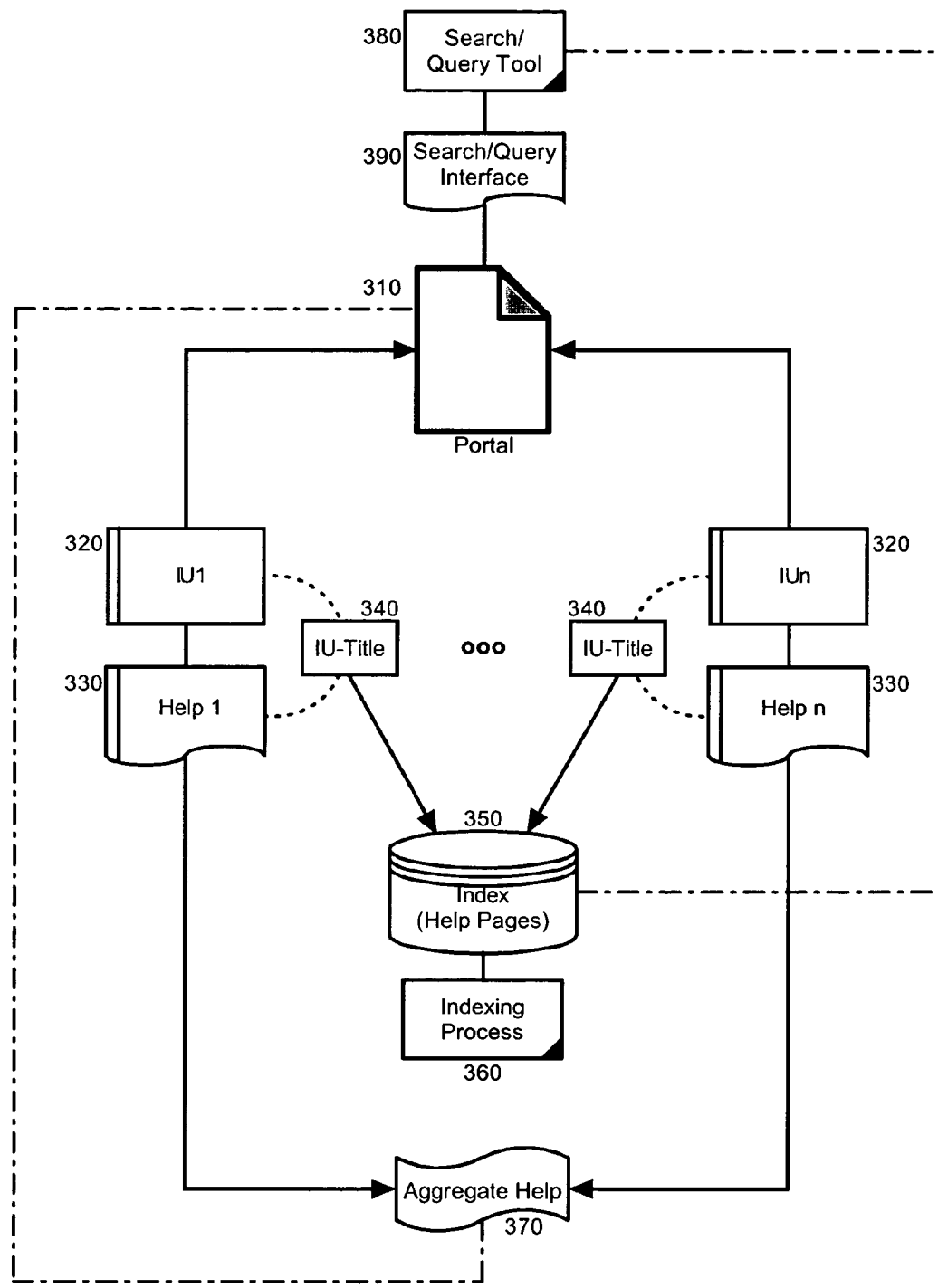
FIG. 3 is a schematic illustration of a system for searching and querying dynamically composed help in a composite help view produced from an aggregated application.

In a preferred aspect of the invention, the system for dynamic aggregation can be configured for searching and querying, and in particular, personalized searching and querying. In further illustration, FIG. 3 depicts a system for searching and querying dynamically composed help in a composite help view produced from an aggregated application. The system can include a search/query tool 380 accessible in a portal application 310 through a search/query interface 390. The portal application 310 can be dynamically composed of individual interface units 320 through the operation of an aggregator (not shown). Each interface unit 320 can be associated with a help content 330, such as a separate help markup language document. The help content 330 can be combined into the aggregated help 370 which can be accessed through the portal application 310.

An indexing process 360 can parse the help content 330 for each interface unit 320 to extract specific information, for instance the title 340 of the associated interface units 320, among other information such as keywords in the help content 330, the author of the associated interface units 320, and hyperlinks both internal to the help content 330 and also internal to the associated interface units 320. The extracted information can be stored in an index 350, which it is important to note, need not contain a direct linkage to the interface units 320, but merely to the help pages 330, and indirectly to the interface units 320 through the storage of the title 340. Using the index 350, the search/query tool 380 can conduct help searches and queries, not directly against the help content 330, but against the data stored in the index 350.

Figure 4:
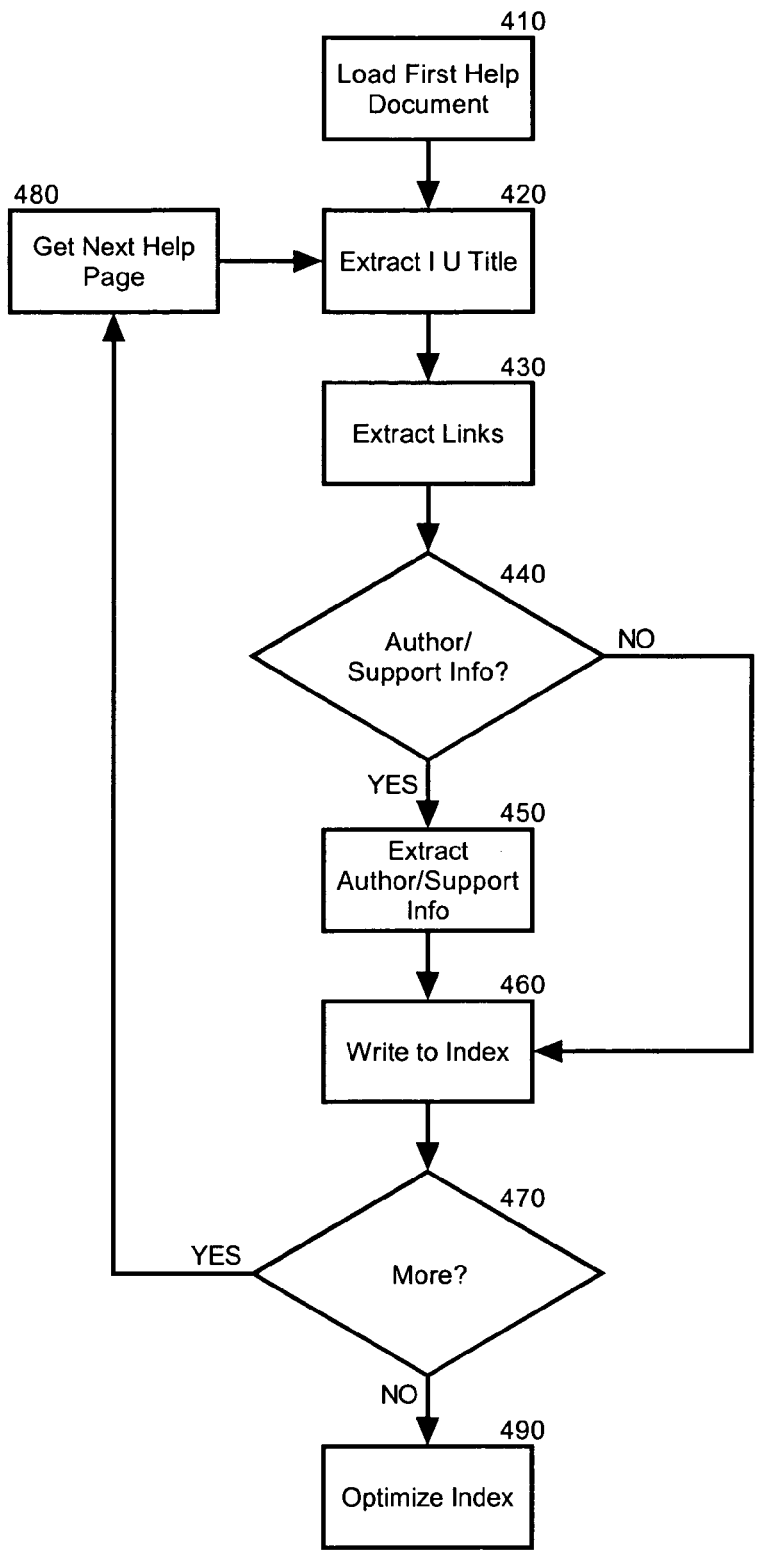
FIG. 4 is a flow chart illustrating a process for searching and querying dynamically composed help in a composite help view produced from an aggregated application.

FIG. 4 is a flow chart illustrating a process for searching and querying dynamically composed help in a composite help view produced from an aggregated application. The process can begin in block 410 with the loading of the first unit of help content. In addition to extracting keywords indicated within the help content, a title of an associated interface unit can be extracted in block 420 as can one or more hyperlinks disposed in the help content in block 430. In decision block 440, if an author or support information for an associated interface unit can be located in the help content, in block 450 the author or support information (or both) can be extracted as well. Finally, in block 460, the extracted information can be written to the index. If, in decision block 470, more help pages remain to be processed, in block 480 a next help page can be loaded and the process of blocks 420 through 470 can repeat. When no help pages remain to be processed, the index can be optimized in block 490 for searching and querying operations and the process can end.

Figure 5:
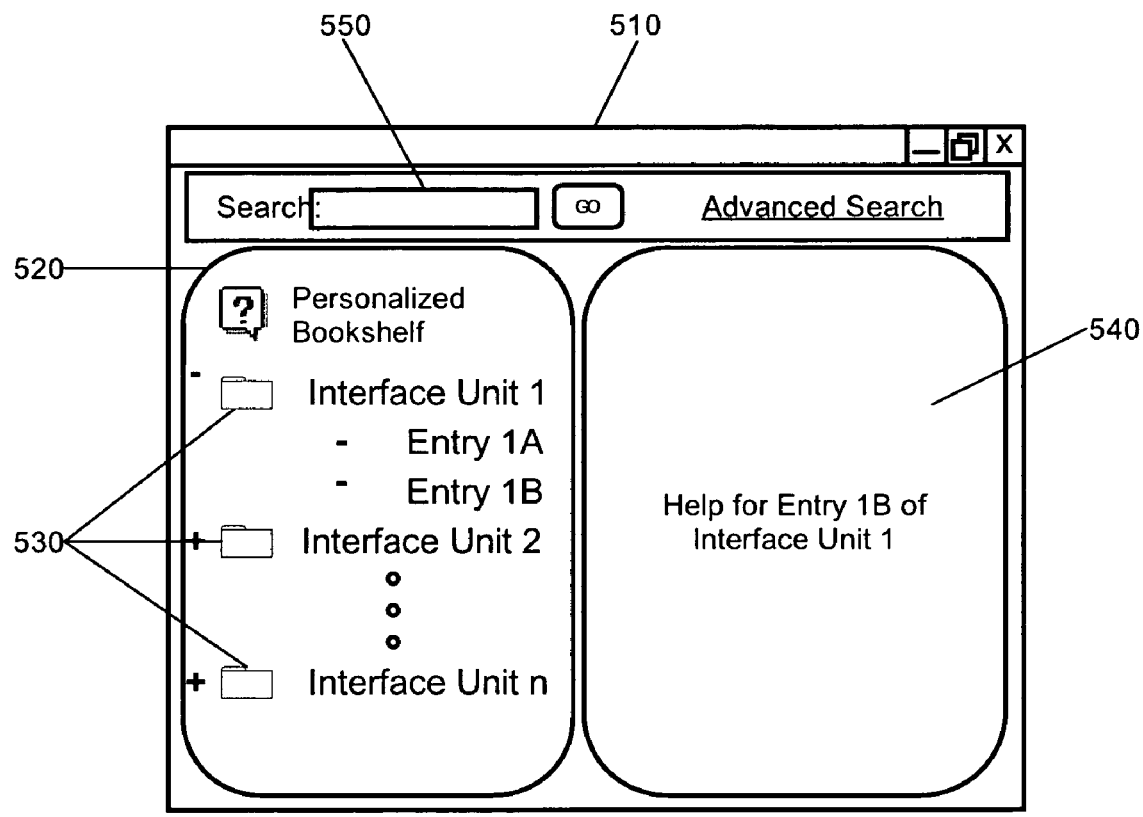
FIG. 5 is a pictorial illustration of an exemplary searching and querying interface for a composite help view produced from an aggregated application; and, FIG. 6 is a flow chart illustrating a process for automatically producing a bookshelf in the system of FIG. 1.

Once the index has been created, queries can be conducted against the index to produce a personalized listing of help pages. Individual queries can be stored so that a set of personalized queries can be assembled into a "bookshelf" of pre-configured queries. The bookshelf can contain linked references to different help pages in the single aggregation through the help index. In this way, preferred and common searches can be pre-specified and re-used on demand by an end user. In further illustration, FIG. 5 is a pictorial view of a personalized bookshelf 520 disposed within a help display 510.

The personalized bookshelf can include a hierarchical listing of pre-specified searches 530 for different interface units. Upon activating any one of the pre-specified searches 530, the corresponding help content 540 can be rendered within the help display 510. Notably, searching logic 550 can be provided for the bookshelf 520. In this regard, the bookshelf 520 which in itself is a pre-specified search, can further be searched in an ad hoc fashion by the end user. Consequently, finely tuned search results can be provided through the pre-screening mechanism of the bookshelf 520.

Figure 6:
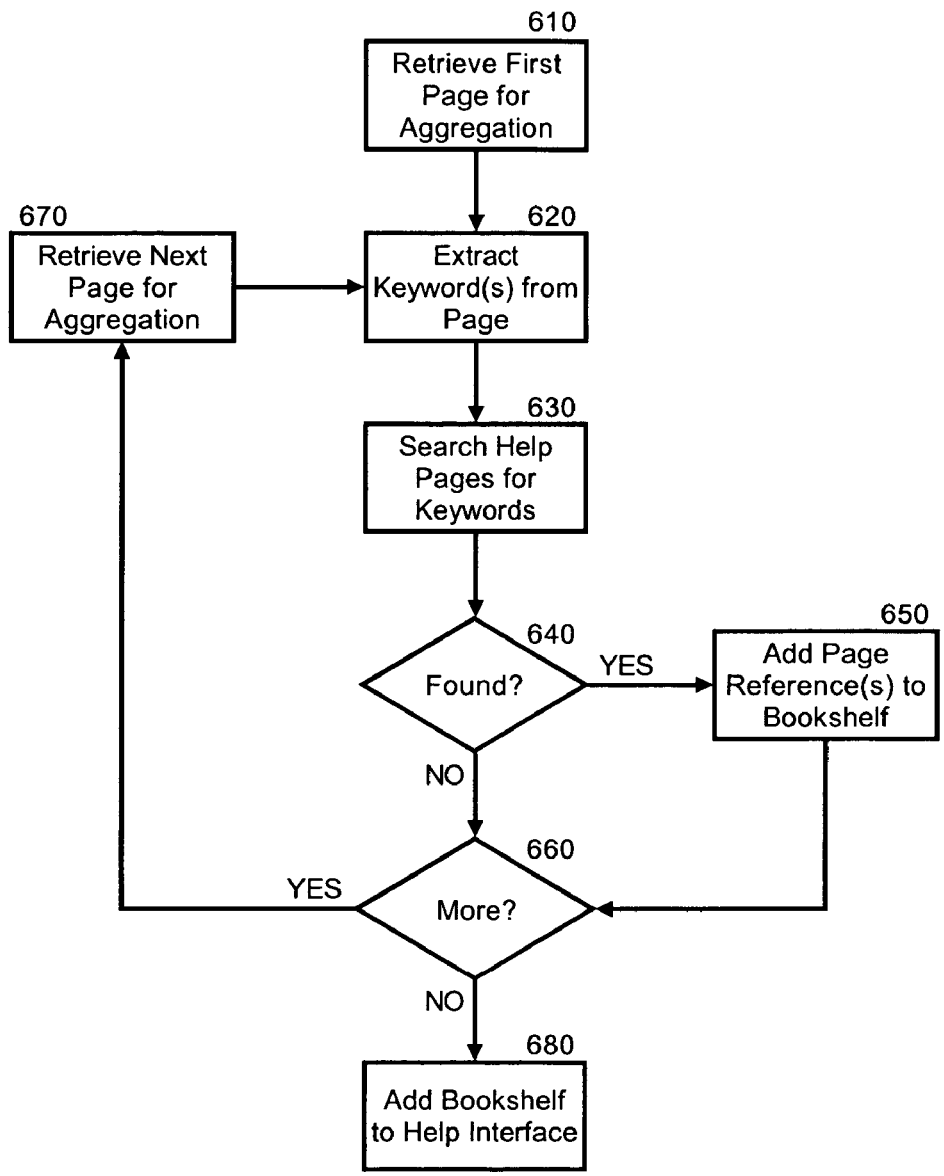

Notably, bookshelves can be created either automatically, or manually by either an applications administrator or an end-user. Furthermore, bookshelves can be created dynamically in the course of changing the nature of the aggregation of portlets. As an example, FIG. 6 is a flow chart illustrating a process for the automatic creation of a bookshelf. Beginning in block 610, a first help page can be retrieved for aggregation. In block 620, keywords can be extracted from the page. In this regard, the keywords can be included in the page as meta-information, or as part of the content of the page itself.

In block 630, one or more queries can be performed against other help pages for the aggregated application using the keywords extracted from the page. If in decision block 640 one or more help pages are located which incorporate the extracted keywords, corresponding references to the help pages can be added to the bookshelf in block 650. Subsequently, in decision block 660, if additional pages in the aggregation remain to be processed, in block 670 the next page can be retrieved for analysis and the process can repeat in blocks 620 through block 660. When no more pages remain to be analyzed, in block 680 the bookshelf can be added to the help interface for the aggregated application.

Once the bookshelf has been automatically generated, queries can be performed against the bookshelf resulting in a more focused help search. Moreover, the process of creating the bookshelf can be repeated manually by an end-user, or by an administrator. Finally, the process can be performed dynamically, whenever pages are removed from or added to the aggregation, resulting in a constantly changing bookshelf.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, accordingly, reference should be had to the following claims, rather than to the foregoing specification, as indicating the scope of the invention.

We claim:

1. A method for configuring a composite help view in an aggregation of applications for search and query operations, the method comprising the steps of:

obtaining at least two separate help documents, each of said at least two separate help documents having an association with a corresponding one of separate applications aggregated together into a single aggregated view;

combining said at least two separate help documents into a composition of help documents corresponding to said single aggregated view and rendering said composition of help documents in a help system view responsive to a request for help initiated in said single aggregated view;

extracting from said help documents search keywords and titles to corresponding ones of said applications in said single aggregated view;

storing said extracted keywords and said titles in a searchable index; and, disposing a search and query interface to said searchable index in said single aggregated view.

2. The method of claim 1, further comprising the steps of:

updating said single aggregated view to include at least one different application;

changing said composition of help documents to include a new separate help document corresponding to said at least one different application; and, rendering said changed composition of help documents in a help system view responsive to a request for help initiated in said updated single aggregated view.

3. The method of claim 1, further comprising the step of restricting help information in said composition of help documents for a particular user to reflect restrictions in said single aggregated view imposed upon said user.

4. The method of claim 1, further comprising the steps of:

performing at least one query of said index through said search and query interface using searching criteria to produce a personalized search result;

storing said personalized search result in a bookshelf; and, rendering said bookshelf in said single aggregated view.

5. The method of claim 4, further comprising the step of applying an additional search against said personalized bookshelf to produce a focused set of search results for terms used in said at least two separate help documents.

6. The method of claim 1, wherein said extracting step further comprises the step of extracting at least one of author contact information for a corresponding one of said applications in said single aggregated view, support information for a corresponding one of said applications in said single aggregated view, an links internal to said help documents, and links external to said help documents.

7. The method of claim 1, further comprising the steps of:
executing a query against said index through said search and query interface;
determining from said titles, address information for locating help documents implicated by said executed query;
rendering individual activatable links to said implicated help documents based upon said address information; and,
responsive to an activation of said at least one of said individual activatable links, locating a corresponding one of said help documents and loading said located corresponding one of said help documents for viewing in said single aggregated view.

8. The method of claim 1, further comprising the steps of:
conducting at least one query using said extracted keywords against other help documents for said aggregation of applications;
storing references to other ones of said help documents produced by said at least one query in a bookshelf; and,
rendering an interface to said bookshelf in said single aggregated view.

9. The method of claim 8, further comprising the step of automatically performing said conducting, storing and rendering steps responsive to one of a manual selection, adding a new help document to said aggregation of applications, and removing an existing help document from said aggregation of applications.

10. A machine readable storage having stored thereon a computer program for configuring a composite help view in an aggregation of applications for search and query operations, the computer program comprising a routine set of instructions which when executed by the machine cause the machine to perform the steps of:
obtaining at least two separate help documents, each of said at least two separate help documents having an association with a corresponding one of separate applications aggregated together into a single aggregated view;
combining said at least two separate help documents into a composition of help documents corresponding to said single aggregated view and rendering said composition of help documents in a help system view responsive to a request for help initiated in said single aggregated view;
extracting from said help documents search keywords and titles to corresponding ones of said applications in said single aggregated view;
storing said extracted keywords and said titles in a searchable index; and,
disposing a search and query interface to said searchable index in said single aggregated view.

11. The machine readable storage of claim 10, further comprising a routine set of instructions for causing the machine to perform the steps of:
updating said single aggregated view to include at least one different application;
changing said composition of help documents to include a new separate help document corresponding to said at least one different application; and,
rendering said changed composition of help documents in a help system view responsive to a request for help initiated in said updated single aggregated view.

12. The machine readable storage of claim 10, further comprising a routine set of instructions for causing the machine to perform the step of restricting help information in said composition of help documents for a particular user to reflect restrictions in said single aggregated view imposed upon said user.

13. The machine readable storage of claim 10, further comprising a routine set of instructions for causing the machine to perform the steps of:
performing at least one query of said index through said search and query interface using searching criteria to produce a personalized search result;
storing said personalized search result in a bookshelf; and,
rendering said bookshelf in said single aggregated view.

14. The machine readable storage of claim 13, further comprising a routine set of instructions for causing the machine to perform the step of applying an additional search against said personalized bookshelf to produce a focused set of search results for terms used in said at least two separate help documents.

15. The machine readable storage of claim 10, wherein said extracting step further comprises the step of extracting at least one of author contact information for a corresponding one of said applications in said single aggregated view, support information for a corresponding one of said applications in said single aggregated view, an links internal to said help documents, and links external to said help documents.

16. The machine readable storage of claim 10, further comprising a routine set of instructions for causing the machine to perform the steps of:
executing a query against said index through said search and query interface;
determining from said titles, address information for locating help documents implicated by said executed query;
rendering individual activatable links to said implicated help documents based upon said address information; and,
responsive to an activation of said at least one of said individual activatable links, locating a corresponding one of said help documents and loading said located corresponding one of said help documents for viewing in said single aggregated view.

17. The machine readable storage of claim 10, further comprising a routine set of instructions for causing the machine to perform the steps of:
conducting at least one query using said extracted keywords against other help documents for said aggregation of applications;
storing references to other ones of said help documents produced by said at least one query in a bookshelf; and,
rendering an interface to said bookshelf in said single aggregated view.

18. The machine readable storage of claim 17, further comprising a routine set of instructions for causing the machine to perform the step of automatically performing said conducting, storing and rendering steps responsive to one of a manual selection, adding a new help document to said aggregation of applications, and removing an existing help document from said aggregation of applications.

* * * * *